2,779,859

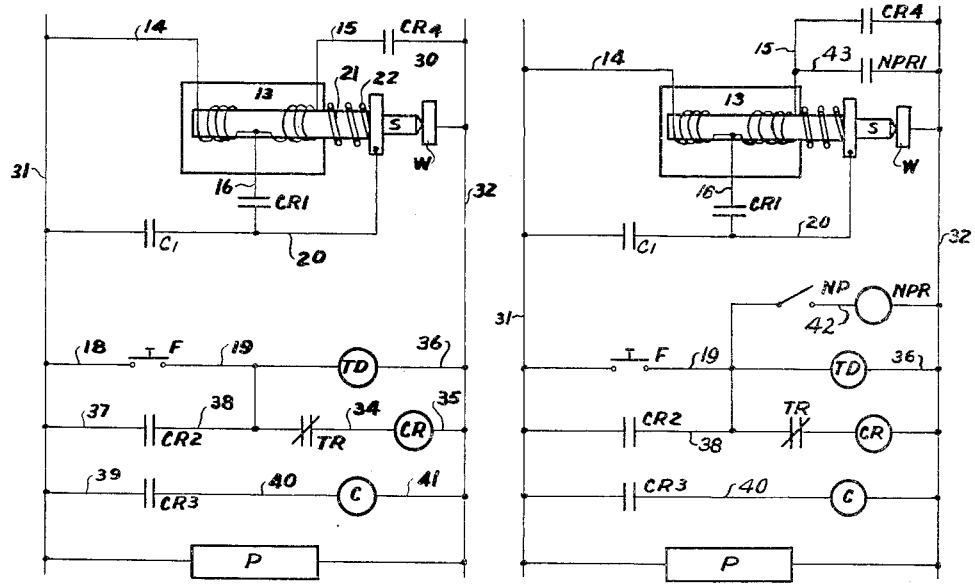
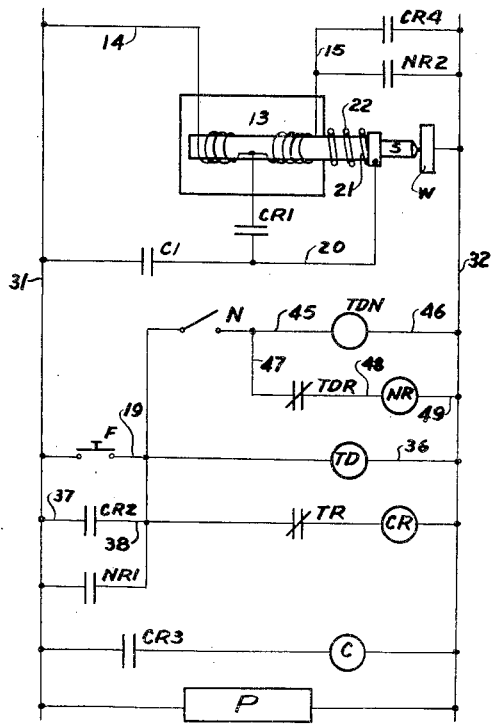
Fig. 1   Fig. 2
Fig. 3
INVENTOR.
Thomas E. Shoup
BY Roger W. Stolle
Clyde H. Haynes
their attorney United States Patent Office 2,779,859
Patented Jan. 29, 1957

STUD WELDING DEVICE

Thomas E. Shoup, Amherst, and Roger W. Sholle, Lorain, Ohio, assignors to Gregory Industries, Inc., Detroit, Mich., a corporation of Michigan Application November 12, 1954, Serial No. 468,376

14 Claims. (Cl. 219—98)

This invention relates to a new method, apparatus and circuits for controlling stud welding and drip or spot welding wherein the stud is not plunged into the molten metal.

In the majority of stud welding equipment on the market the stud is connected to one side of a source of welding current and a plate to which the stud is to be welded is connected to the other side of the source of welding current. In the most popular equipment a solenoid in a stud welding gun is connected in series with the stud. As soon as welding current starts to flow through the solenoid, the stud and plate, the solenoid retracts the stud from the plate to draw an arc between the stud and the plate. This arc is initiated by the welding current which flows through the solenoid. After the arc has continued for a definite period of time sufficient to melt the end of the stud and the plate, the source of welding current is disconnected and the stud is plunged into the plate. This apparatus and method has produced excellent results on studs of various diameters and materials.

In another type of stud welding wherein an arc is drawn between the stud and the plate, the stud was also lifted from the plate to establish an arc by a solenoid. However, the solenoid was powered by a circuit entirely independent of the welding circuit. A design of this type required very close control of the switches and contactors in both circuits to ensure correct timing of operation.

In another type of stud welding a high frequency current superimposed on the welding current has been used to initiate an arc between the stud and the plate. This type of equipment does not necessarily need a solenoid since the stud can be positioned at the arc distance from the plate and the high frequency current will span the gap to initiate an arc.

In another of the prior devices a solenoid was used to lift the stud from the plate to establish an arc. In this device a solenoid, the stud, and the plate were connected in series to a source of relatively low current value. The sole purpose of this low current was to lift the stud and strike an arc. The welding current source was then connected to the stud and plate with the welding current also flowing through the arc to melt the end of the stud and the plate. In this device separate sources of current were needed for the welding and for the arc initiating current. The arc initiating current flowed throughout the entire duration of the flow of welding current.

These prior devices which require two sources of current, do not lend themselves to a portable hand tool which can easily be moved from place to place. Many applications of stud welding are performed from battery power, rectifiers or motor generator sets, in such places as new construction, steel mills, etc. Many times on construction jobs and even in other locations portable power units must be used for the welding. If the stud welding equipment will work on a single source of power, the cost and amount of equipment needed for power is greatly reduced. It is only necessary to supply one power source for the present invention.

In drip welding the stud is lifted from the plate to draw an arc and a portion of the end of the stud is melted. This melted portion of the stud drips into the work plate to form the weld. However, the stud is held away from the work plate until after the molten metal hardens so that the main body of the stud will not become welded to the plate. When a non-consumable stud is used only the portion of the plate is melted by the arc. Best results are obtained when the non-consumable stud is maintained away from the plate until after the molten material in the plate has hardened to form the weld.

One of the objects of the invention is to provide a portable stud welding tool which will operate from a single source of power and which is adapted to weld many sizes of studs.

Another object of the invention is to provide a stud welding device and method which lends itself to a small, compact, lightweight hand tool which will accommodate studs of many sizes.

Another object of the invention is to provide a stud welding device in which the lifting current is not varied by variations in the welding current even though both currents are obtained from the same source of power.

Another object of the invention is to provide a stud welding hand tool which will weld studs from approximately 1/8" diameter to over 1 1/2" diameter without excessive heating of the hand tool.

Another object of the invention is to provide a method of stud welding wherein the stud, plate and a lifting coil are connected in series to a source of current followed by the connecting of the source of current directly to the stud and plate to melt the end of the stud and simultaneously shunt the lifting coil to render it ineffective and finally plunging the stud into the plate and disconnecting the source of current.

Another object of the invention is to provide a method of stud welding wherein the lifting coil is shunted by the connecting of the source of current to the stud and wherein a holding coil is simultaneously energized to hold the stud at the arc distance from the plate.

Another object of the invention is to provide a welding circuit wherein a stud is lifted from a plate to draw a welding arc, the welding arc is maintained for a definite period of time and the stud is held away from the plate for a longer period of time to allow molten metal in the plate to harden after the arc is extinguished.

Another object of the invention is to provide a stud welder with a first circuit including a lifting coil to lift the stud from the plate and strike an arc therebetween, a second circuit including a holding coil to maintain the stud in lifted position and maintain a welding arc between the stud and plate, and a control circuit controlling these first and second circuits with the control circuit having inherent capabilities to maintain the first circuit after de-energizing the second circuit to keep the stud lifted after the welding arc is extinguished so that the stud will not be plunged into the molten metal of the plate.

Other objects and a fuller understanding of the invention will become apparent from the description and claims and the drawings in which:

Figure 1 is a schematic illustration of the preferred stud welding circuit;

Figures 2 and 3 are modifications of the circuit of Figure 1 for drip welding.

Figure 4:
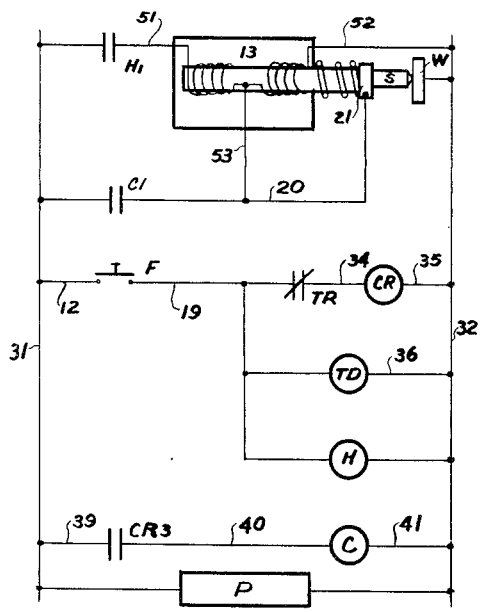
Figures 4, 5, 6 and 7 are other modifications of stud welding circuits which are adaptable to drip or spot welding.

The gun and solenoid used in the present invention are the same as that used in our pending application Serial Number 421,780, filed April 8, 1954, entitled "Stud Welding Method and Device." For this reason only the necessary parts of the gun and solenoid are schematically illustrated and demonstrated here to point out the mode of operation of the welding currents and the methods of welding applied by using the circuits. As in the pending patent application, the gun has a solenoid coil 13, a stud holder 21 and a stud plunger spring 22. The solenoid coil 13 is capable of overcoming the stud plunger spring 22 for lifting a stud S from a work plate W to hold it in a predetermined position at a definite distance from the work plate for a definite period of time. When the solenoid coil 13 is de-energized, the plunger spring 22 plunges the stud in the work plate W.

The stud welding circuit illustrated in Figure 1 includes a welding contactor C1 and its contactor coil C which is controlled by a normally closed time delay relay switch TR and its delay coil TD and control relay switches CR1, CR2, CR3 and CR4 and their control relay coil CR. One end of the solenoid coil 13 is connected by an end lead 14 to one side 31 of a source of welding power P. The other end of the coil 13 is connected by an end lead 15 to one side of the control relay switch CR4 and a lead 30 connects the other side of the control relay switch CR4 to the other side 32 of the welding current source of power P. One side of the welding contactor C1 is connected directly to the side 31 of the welding current source and the other side of the contactor C1 is connected by suitable welding cable 20 to the stud holder 21. The control relay switch CR1 has one side thereof connected to the welding cable 20 and the other side thereof connected by a lead 16 to the solenoid coil 13 at a point between the ends thereof. That portion of the solenoid coil 13 which is between the lead 14 and the lead 16 is termed the lifting portion and that portion of the coil between the lead 15 and the lead 16 is termed the holding portion of the coil.

Also connected to the side 31 of the welding current source by a lead 18 is the gun button F which is also connected by a lead 19 to one side of the time delay relay switch TR and one side of the time delay coil TD. A lead 34 connects the other side of the time delay relay switch TR to one side of the control relay coil CR and a lead 35 connects the other side of the control relay coil CR to the side of the power source P. Similarly a lead 36 connects the other side of the time relay coil TD to the power side 32. The control relay switch CR2 has one side thereof connected by lead 37 to power source side 31 and the other side thereof connected by lead 38 to the previously mentioned lead 19. The control relay switch CR3 has one side thereof connected by lead 39 to side 31 of power source P and the other side thereof connected by lead 40 to one side of the contactor coil C, the other side of which is connected to side 32 of the welding current source P by lead 41.

The welding and control circuit of Figure 1 operates as follows: After a stud is placed in the gun and positioned against the work plate W, the operator closes the gun button F to electrically connect leads 18 and 19. This starts a relatively low current flowing through leads 18 and 19, time delay coil TD and lead 36 to energize the time delay coil TD. Current also flows through leads 18, 19, 34 and 35 and normally closed time delay relay switch TR to energize control relay coil CR. Energization of control relay coil CR causes it to close control relay switches CR1, CR2, CR3 and CR4. The closing of switch CR2 shunts or interlocks the gun button F with current flowing through leads 37 and 38 to lead 19 to maintain energization of control relay coil CR and time delay coil TD in case the gun button F is released or opened during welding. The closing of control relay switch CR1 allows current to flow from the welding current source P through leads 31 and 14, the solenoid coil 13, through lead 16, control relay switch CR1, welding cable 20, stud holder 21, stud S, work plate W and lead 32 to the opposite side of the welding current source P. This lifting portion of coil 13 limits the current to a relatively small current flow which is sufficient to cause the coil 13 to lift the stud S from the plate W and strike a pilot arc between the stud and plate.

The control relay switch CR3 is closed simultaneously with switch CR1 and current flow is established from the power source on the side 31 to side 32 through leads 39, 40 and 41 and the contactor coil C and at the same time the solenoid coil is energized to strike the arc. As soon as contactor coil C is energized, it closes contactor C1 allowing welding current to flow from power source side 31 through welding cable 20, stud holder 21, stud S, the arc and plate W to side 32. The closing of contactor C1 shunts control relay switch CR1 and the lifting portion of the coil 13 thereby rendering the lifting portion of the coil 13 ineffective and completely substituting a full welding arc for the pilot arc. Simultaneously the holding portion of the coil 13 becomes effective due to the resistance of the welding arc to hold the stud S lifted from the plate W to maintain the welding arc. After a definite period of time, time delay relay switch TR opens, de-energizing control relay coil CR to open control relay switches CR1, CR2, CR3 and CR4. Opening the control relay switch CR3 de-energizes contactor coil C to open contactor C1 and stop the flow of welding current. After time delay coil TD is de-energized by opening control relay switch CR2, time delay relay switch TR returns to its normally closed position. All of the switches are now in their original position whereby a new stud may be inserted in the stud holder. By opening the switches CR1 and CR4 current is completely removed from the solenoid coil to permit plunging of the stud at the correct instant relative to opening the welding contactor C1. Opening these switches also cancels any residual effects which might be built up to continue flow of current through the holding portion of the coil 13, switches CR1 and CR4, the stud and plate W.

The circuit illustrated in Figure 2 is generally similar to that of Figure 1. However, in Figure 2 a no-plunge switch NP, no-plunge relay coil NPR, and a no-plunge relay switch NPR1 have been added to the circuit. The no-plunge switch NP and the no-plunge relay coil NPR are connected in series in leads 42 between lead 19 and the side 32 of the source of power P. The no-plunge relay switch NPR1 is similarly connected by lead 43 between the lead 15 from the one end of the solenoid coil and the power source side 32 so that the switch NPR1 is in parallel circuit with the contactor relay switch CR4. The no-plunge switch NP is a manually operated switch which when in open position permits the circuits to operate the same as in Figure 1. However, when the no-plunge switch NP is closed, the operator can continue the flow of current through the no-plunge coil NPR to hold the stud away from the plate after the contactor C1 and the control relay switches CR1 and CR4 open by holding the button F closed. As long as the button F is held closed, the no-plunge coil NPR is energized to keep the no-plunge switch NPR closed and energize solenoid coil 13 through leads 14 and 43.

The modified circuit in Figure 3, like that of Figure 2, may be used to prevent plunging of the stud after the welding current has been shut off so that the main body of the stud cannot become welded to the work plate. This modification includes the same circuit as used in Figure 1 and adds to it a timing circuit which will prevent plunging of the stud until after the molten metal has hardened. The timing circuit for performing this function includes no-plunge switch N, no-plunge coil NR and its no-plunge relay switches NR1 and NR2, no-plunge time delay coil TDN and a no-plunge time delay switch TDR. In this circuit one side of the no-plunge switch N is connected to the lead 19 and the other side is connected by a lead 45 to one side of the no-plunge time delay coil TDN, the other side of which is connected to side 32 of the power supply by a lead 46. One side of the no-plunge time delay switch TDR is connected by a lead 47 to the lead 45 and the other side of this switch TDR is connected by lead 48 to the no-plunge coil NR, the other side of which is connected directly to the side 32 of the power supply by a lead 49. The no-plunge relay switch NR1 has one side thereof connected to the side 31 of the power supply and the other side thereof connected to the lead 38 so that it operates in parallel with the control relay switch CR2. Similarly one side of the no-plunge relay switch NR2 is connected to the lead 15 and the other side is connected to the side 32 of the power supply so that it operates in parallel with the control relay switch CR4.

When no-plunge switch N is open, the circuit of Figure 3 operates the same as the circuit of Figure 1. However, when the switch N is closed, the no-plunge circuit functions to prevent plunging of the stud after the welding current is shut off by opening contactor C1. This circuit operates in the following manner when the no-plunge switch N is closed. Closing finger button switch F energizes no-plunge time delay coil TDN at the same time the time delay coil TD is energized, simultaneously passing current through the normally closed no-plunge time delay switch TDR and the no-plunge coil NR. Energizing of the no-plunge coil NR closes no-plunge relay switches NR1 and NR2 the same as the control relay coil CR closes the switches CR2 and CR4. The no-plunge time delay switch TDR is manually adjusted so that it stays closed a longer period of time than the time delay relay switch TR, thus permitting the opening of the switches CR1, CR2, CR3 and CR4 prior to the opening of the switches NR1 and NR2. The welding contactor C1 thus is also opened prior to the opening of the no-plunge relay switches (NR1 and NR2. After the switches CR1 and CR4 have been opened and the welding current contactor C1 has been opened, a small amount of current flows through the lead 14, coil 13, lead 15, and switch NR2 to keep the coil energized and maintain the stud lifted from the plate. When the no-plunge time delay switch TDR opens the no-plunge coil NR is deenergized, thus re-opening the switches NR1 and NR2. This breaks the solenoid circuit and allows the stud to plunge and returns the circuit to original position for another operation. The molten metal at the end of the stud and on the adjacent work plate W has hardened by this time so that the stud does not become welded to the work plate when it is plunged therein.

A very simple circuit, which will control the time of flow of the welding current and yet permit the holding of the stud away from the plate until after the weld metal hardens, is illustrated in Figure 4. In this circuit the solenoid coil 13 has one end thereof connected through a hold switch H1 to the side 31 of the source of power P by lead 51. The other side of the solenoid coil 13 is connected by lead 52 to the other side 32 of the power source. As in the other figures one side of the welding contactor C1 is connected directly to the one side 31 of the welding power source and the other side of the welding contactor is connected by welding cable 20 to the stud holder 21. In this circuit the center tap of the solenoid 13 is connected by lead 53 directly to the welding cable 20.

The timing control includes the regular gun button or finger switch F, the time delay relay switch TR, the time delay coil TD and the control relay coil CR, which are connected in the same manner and as illustrated in Figure 1. Therefore, the reference characters 18, 19, 34, 35 and 36 of Figure 1 refer to the same lead wires in Figure 4. One side of the hold coil H is connected to the lead 19 and the other side of the hold coil H is connected to the side 32 of the power source P. Also as in the circuit diagram of Figure 1, the control relay switch CR3 and the contactor coil C are connected between the sides 31 and 32 of the power source by the leads 39, 40 and 41.

This circuit of Figure 4 operates as follows: Closing finger switch F causes current to flow through time delay relay switch TR, control relay CR, time delay coil TD and hold coil H. Hold coil H closes hold switch H1 to initiate current flow through a portion of the solenoid coil 13 and the stud so that the stud is lifted from the plate and an arc is struck. Energizing control relay coil CR closes control relay switch CR3 which in turn energizes contactor coil C to close the welding contactor C1 thereby increasing the current flowing through the arc to full welding current. After a predetermined interval of time the time delay relay switch TR opens deenergizing control relay coil CR thus opening control relay switch CR3 to de-energize contactor coil C and open the welding current contactor C1 thus stopping the flow of welding current through the arc. Continued holding of the finger switch F closed allows current to flow through the hold coil H, thereby holding the hold switch H1 closed to keep the solenoid 13 energized and keep the stud lifted from the plate after welding current has been stopped. This continued holding current flows through the solenoid and leads 51 and 52 and not through the gap between the stud and the work plate. The stud will be held lifted as long as the finger switch F remains closed.

Figure 5:
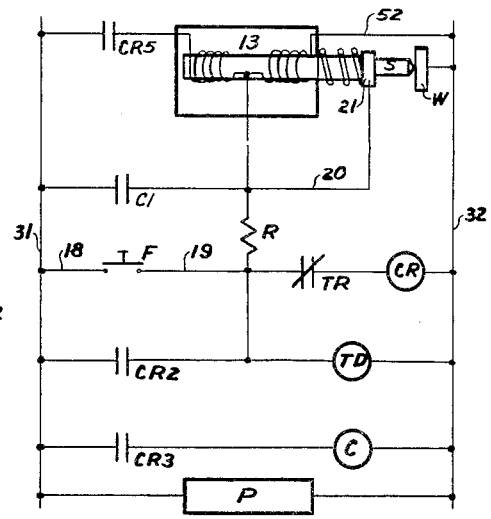

The circuit of Figure 5 is similar to that of Figure 4. However, in the circuit of Figure 5 a switch CR5 replaces the switch H1, switch CR5 is operated and controlled directly by the coil CR. A resistance R has also been added between the leads 19 and 20 so that a light current can flow through switch CR2, resistance R, part of solenoid 13 and lead 52 to hold the stud lifted from the plate after contactor C1 and switch CR5 have been opened. In this circuit the welding operation is initiated by closing the finger switch F. However, if the finger switch F is held in the closed position until after the completion of the welding current cycle, the current will continue to flow through the switch F, resistance R, and part of the solenoid, to maintain the stud lifted from the plate after welding current flow has stopped, the same as is done in Figure 4 by holding the switch F closed.

Figure 6:
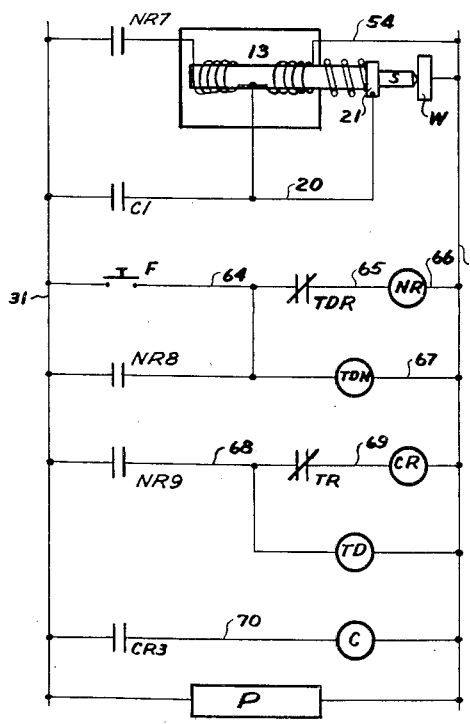

In Figure 6 one side of the solenoid coil 13 is connected through no-plunge time delay switch NR7 to side 31 of the power source P and the other end of the solenoid coil 13 is connected by lead 54 to the side 32 of the power source P. As in the previous circuits, welding contactor C1 is connected to side 31 of the power source P and to the stud holder 21 by welding cable 20. The center of the solenoid coil 13 is also connected to the welding cable 20. In this circuit the initiating of the arc and the energization of the solenoid coil 13 by means of no-plunge time delay switch NR7 is controlled by a circuit, including gun button switch F, no-plunge time delay switch TDR, no-plunge coil NR, no-plunge time delay switch NR8, and no-plunge time delay coil TDN. The flow of welding current is controlled by welding contactor C1 operated by contactor coil C which is energized through control relay switch CR3. This control relay switch CR3 is controlled by control relay coil CR which is in a circuit including switch NR9, time delay relay switch TR and time delay coil TD. One side of each of the switches F, NR8, NR9 and CR3 is connected to the side 31 of the power source. The other side of the switch F is connected by lead 64 to one side of the no-plunge time delay switch TDR and one side of the no-plunge time delay coil TDN. The other side of the no-plunge time delay switch TDR is connected by lead 65 to one side of the no-plunge coil NR, the other side of which is connected by lead 66 to the side 32 of the power source. The lead 64 also connects the opposite side of the no-plunge time delay switch NR8 to one side of the no-plunge time delay coil TDN the opposite side of which is connected by lead 67 to side 32 of the power source P. Similarly lead 68 connects the opposite side of the switch NR9 to one side of the time delay relay switch TR which is connected by lead 69 to the control relay coil CR, the other side of which is connected directly to the side 32 of the power source. Lead 68 is also connected to one side of the time delay coil TD, the other side of which is connected directly to the power source side 32. The control relay switch CR3 is connected by lead 70 to one side of the contactor coil C, the other side of which is connected to the side 32 of the power source P.

The circuit of Figure 6 operates as follows. When finger button switch F is closed, current flows through the lead 64, normally closed switch TDR and coils NR and TDN to energize these coils NR and TDN. Coil NR closes switches NR7, NR8 and NR9. Closing switch NR9 energizes coil CR through normally closed switch TR and also energizes coil TD. When coil CR is energized, it closes the switch CR3 energizing coil C and closing the welding contactor C1. Prior to this, however, the welding arc has been initiated and the stud lifted from the plate by the solenoid 13, since the switch NR7 was closed before the welding contactor C1 was closed. When the welding contactor C1 is closed, it shunts out the switch NR7 and expands the pilot arc to full welding current arc. After a predetermined time the switch TR opens, thus de-energizing coil CR to open the contactor C1 and stop the welding current. When the welding contactor C1 is opened, current again begins to flow through the switch NR7, and the coil 13 thus holding the stud at the arc distance away from the work plate and preventing plunging of the stud. After a further predetermined time the switch TDR opens, thus de-energizing coil NR and opening the switches NR7, NR8 and NR9. Opening of the switch NR7 de-energizes the solenoid coil 13 and opening of the other switches returns the circuit to its initial position. It is noted with this circuit that the finger switch F does not have to be held closed throughout the duration of the cycle since it is shunted and interlocked by the switch NR8.

Figure 7:
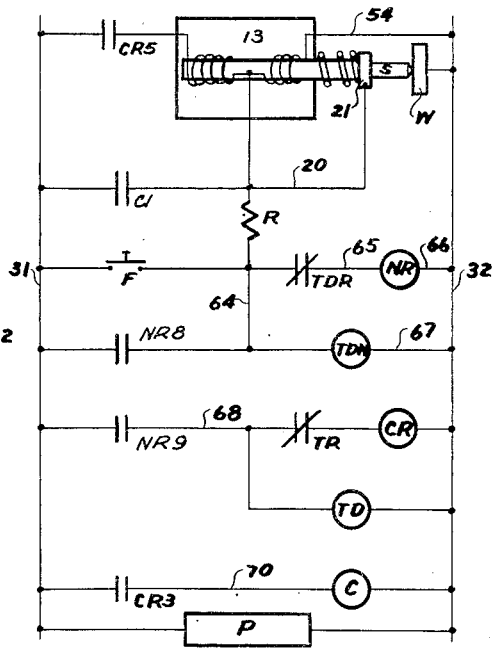

The circuit of Figure 7 performs substantially the same function as that of Figure 6. In many respects the circuits are similar. However, in Figure 7 the no-plunge time delay switch NR7 has been replaced by a control relay switch CR5 which is operated and controlled by the coil control relay CR, instead of being operated and controlled by the no-plunge coil NR. In this circuit a resistance R has also been inserted between leads 20 and 64. In this circuit the switch CR5 is opened just prior to the opening of the welding current contactor C1. The solenoid coil continues to maintain the stud in its lifted position after the opening of the switches CR5 and C1 by means of the resistance R. Current flows through the switch NR8, resistance R hold portion of coil 13 and lead 54 so long as the switch NR8 is held in closed position by the coil NR. However, after the switch TDR has timed out, it opens to de-energize the coil NR and open switch NR8 so that all current flow is removed from the solenoid coil 13 and the stud is allowed to plunge against the plate. Switch TDR times out later than switch TR so that the studs plunge after the molten metal has hardened, thereby preventing welding of the stud to the plate W.

In the various circuits we have described using a relatively low current through the lifting portion of the coil and through the holding portion of the coil as compared to the welding current. In actual practice we have been able to weld studs with the current going through the lifting portion of the coil to strike the pilot arc being in the neighborhood of 10 to 40 amperes. A full welding current may be anywhere from 300 to 5000 amperes or larger depending on the stud being welded. In this same instance the current flowing through the holding portion of the coil during the actual welding was only in the neighborhood of 1 ampere. It is understood that these specific values were used in a particular set-up and that the values may be changed if the need arises.

Although this invention has been described in its preferred form with a certain degree of particularity enabling others to reproduce the invention, it is understood that the present disclosure has been made by way of example and that numerous modifications and changes in the details may be resorted to without departing from the spirit and scope of the invention as defined in the claims which are made a part hereof.

The embodiments of the invention in which an exclusive property or privilege is claimed are defined as follows:

1. An electrical circuit for a stud welder adapted to lift a stud from a work piece to draw an arc therebetween, said circuit comprising, a first circuit including a lifting coil to lift the stud from the plate and strike an arc therebetween, a second circuit to maintain a welding arc between the stud and plate and including a holding coil to maintain the stud in lifted position, and a control circuit operatively connected with said first and second circuits to maintain energization of at least one of said coils to keep the stud lifted while effecting de-energization of the welding arc, said control circuit having timer means therein.

2. The electrical circuit of claim 1 wherein said timer means in said control circuit includes a first timer controlling the second circuit and a second timer controlling the first circuit and the energization of the first timer.

3. The structure of claim 1 including an electrical connection between the first and second circuit with a portion of the second circuit effectively shunting at least the lifting coil in the first circuit while the second circuit is energized.

4. The structure of claim 1 including switches in said first and second circuits and an electrical connection between the first and second circuits with the switch in the second circuit effectively shunting the switch and lifting coil in the first circuit while the switch in the second circuit is closed.

5. The electrical circuit of claim 4 wherein said timer means in said control circuit includes a first timer controlling the switch in the second circuit and a second timer controlling the first circuit and the switch in the energization of the first timer.

6. In a stud welding device having a supporting structure, the provision of a stud carrying member, resilient means urging the stud carrying member away from the supporting structure, a solenoid in the supporting structure including an armature operatively connected to the stud carrying member and a coil capable of overcoming the resilient means and drawing the armature and the stud carrying member towards the supporting structure, first means including a first switch for connecting one end of the solenoid coil to one side of a welding current source, a lead for connecting the other end of the solenoid coil to the other side of a welding current source, a second means including a contactor for connecting the stud carrying member to the said one side of the welding current source, third means for electrically connecting the stud carrying member to the solenoid coil at a point between the ends thereof, a weld timing circuit connected electrically in parallel with said first means, said coil and said lead, said timing circuit including a manually operable switch to energize the timing circuit and timing means to control said first switch and said contactor, and a resistance element electrically connected between said manually operable switch and said third means.

7. The structure of claim 6 including a relay consisting of normally open points in parallel with the switch in the first means and a point closing coil in series with the manually operable switch.

8. In a stud welding device having a supporting structure, the provision of a housing, a stud carrying member in said housing, resilient means urging the stud carrying member away from the housing, a solenoid in the housing operatively connected to the stud carrying member and capable of overcoming the resilient means and drawing the carrying member towards the housing, a first circuit including a switch connecting at least a first part of said solenoid in series with said stud carrying member, a second circuit including a contactor and at least a second part of said solenoid, timing means controlling said switch and said contactor, and a third circuit including a manually operable switch and a resistance element connected in series, said third circuit being electrically connected in parallel with said contactor to continue flow of current through said second part of said solenoid after the contactor has opened.

9. The structure of claim 8 including a relay consisting of normally open points in parallel with the switch in the first circuit and a point closing coil in series with the manually operable switch.

10. An electrical circuit for a stud welder adapted to lift a stud from a work piece to draw an arc therebetween, said circuit comprising, a first circuit including a lifting coil to lift the stud from the plate and strike an arc therebetween, a second circuit including a holding coil to maintain the stud in lifted position and maintain a welding arc between the stud and plate, and a control circuit controlling said first and second circuits.

11. In a stud welding device having a supporting structure, the provision of a stud carrying member, resilient means urging the stud carrying member away from the supporting structure, a solenoid in the supporting structure including an armature operatively connected to the stud carrying member and a coil capable of overcoming the resilient means and drawing the armature and the stud carrying member towards the supporting structure, first means for connecting one end of the solenoid coil to one side of a welding current source, second means for connecting the other end of the solenoid coil to the other side of a welding current source, third means including a contactor connecting the stud carrying member to the said first means, fourth means electrically connecting the stud carrying member to the solenoid coil at a point between the ends thereof, said second and fourth means each having a switch, a weld timing circuit connected electrically in parallel with said first means, said coil and said second means, said timing circuit including a manually operable switch to energize the timing circuit and timing means to control said switches in said second and fourth means and said contactor.

12. In a stud welding device having a supporting structure, the provision of a stud carrying member, resilient means urging the stud carrying member away from the supporting structure, a solenoid in the supporting structure including an armature operatively connected to the stud carrying member and a coil capable of overcoming the resilient means and drawing the armature and the stud carrying member towards the supporting structure, first means for connecting one end of the solenoid coil to one side of a welding current source, second means for connecting the other end of the solenoid coil to the other side of a welding current source, third means including a contactor connecting the stud carrying member to the said first means, fourth means electrically connecting the stud carrying member to the solenoid coil at a point between the ends thereof, at least one of said means having a first switch, a weld timing circuit connected electrically in parallel with said first means, said coil and said second means to control said first switch and said contactor.

13. An electrical circuit for a stud welder adapted to lift a stud from a work piece to draw an arc therebetween, said circuit comprising, a first circuit including a lifting coil to lift the stud from the plate and strike an arc therebetween, a first switch in said first circuit in series with said lifting coil, a second circuit including a contactor, a holding coil and a second switch to maintain the stud in lifted position and maintain a welding arc between the stud and plate, one end of said lifting coil and one end of said holding coil being permanently electrically joined together, and a control circuit controlling said first and second switches and said contactor.

14. An electrical circuit for a stud welder adapted to lift a stud from a work piece to draw an arc therebetween, said circuit comprising, a first circuit including a lifting coil to lift the stud from the plate and strike an arc therebetween, a first switch in said first circuit in series with said lifting coil, a second circuit including a contactor, said first switch, a holding coil and a second switch to maintain the stud in lifted position and maintain a welding arc between the stud and plate, and a control circuit controlling said first and second switches and said contactor.

References Cited in the file of this patent

UNITED STATES PATENTS

| | | |
|---|---|---|
| 2,265,169 | Hughes et al. | Dec. 9, 1941 |
| 2,342,144 | Hughes | Feb. 22, 1944 |
| 2,356,320 | Hughes | Aug. 22, 1944 |